US009165082B2

(12) United States Patent
Kim et al.

(10) Patent No.: US 9,165,082 B2
(45) Date of Patent: Oct. 20, 2015

(54) DIRECT NAVIGATION THROUGH BROWSER ADDRESS BAR

(75) Inventors: Jane T. Kim, Seattle, WA (US); Warren G. Stevens, Redmond, WA (US); Laura J. Gehring, Bellevue, WA (US); Sarah J. Bowers, Snohomish, WA (US); Clint C. Jorgenson, Carnation, WA (US); Pui Ching Hon, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/011,112

(22) Filed: Jan. 21, 2011

(65) Prior Publication Data

US 2012/0192089 A1 Jul. 26, 2012

(51) Int. Cl.
*G06F 3/048* (2013.01)
*G06F 17/30* (2006.01)
*H04L 29/08* (2006.01)

(52) U.S. Cl.
CPC .... *G06F 17/30887* (2013.01); *G06F 17/30864* (2013.01); *H04L 67/02* (2013.01)

(58) Field of Classification Search
USPC .................................................. 715/760, 810
See application file for complete search history.

(56) References Cited

U.S. PATENT DOCUMENTS 6,009,459 A * 12/1999 Belfiore et al. ............... 709/203
7,376,752 B1 * 5/2008 Chudnovsky et al. ........ 709/245
2005/0097089 A1 * 5/2005 Nielsen et al. ................... 707/3
2005/0149576 A1 7/2005 Marmaros et al.
2005/0240576 A1 10/2005 Piscitello et al.
2006/0112066 A1 * 5/2006 Hamzy .............................. 707/1
2007/0174286 A1 * 7/2007 Seitz et al. ....................... 707/10
2008/0059419 A1 3/2008 Auerbach et al.
2009/0006389 A1 1/2009 Piscitello et al.
2009/0150826 A1 * 6/2009 Lyndersay et al. ............ 715/810
2010/0131902 A1 5/2010 Teran et al.
2010/0306237 A1 12/2010 Chandley et al.

FOREIGN PATENT DOCUMENTS

| CN | 1806240 | 7/2006 |
| CN | 101019119 | 8/2007 |
| WO | WO 2006019852 | 2/2006 |

OTHER PUBLICATIONS

Google Groups, I'm Feeling Lucky for google searches typed into address bar, Apr. 6, 2010, http://productforums.google.com/forum/#!topic/chrome/wUGneNuldRg.*

(Continued)

*Primary Examiner* — William Trapanese
(74) *Attorney, Agent, or Firm* — John Jardine; Kate Drakos; Micky Minhas

(57) ABSTRACT

In one or more embodiments, a Web browser receives user input in the form of text that is entered in a suitably-configured text entry bar, such as an address bar. The web browser processes the text and ascertains whether the text appears to be a search or an attempted navigation. Based on whether the text appears to be a search or an attempted navigation, the web browser communicates the text to a search provider, along with an indication of whether the text appears to be a search or an attempted navigation. The search provider receives the text and the indication and can then take appropriate action as by returning a search results page or causing the web browser to be redirected to a website associated with the received text.

19 Claims, 6 Drawing Sheets

(56) References Cited

OTHER PUBLICATIONS

"International Search Report", Mailed Date: Aug. 22, 2012, Application No. PCT/US2012/021005, Filed Date Jan. 12, 2012, Pages 9.

"Direct Navigation: The Foundation for the Online Business of Brands and of Cybersquatters, Part 1of 3", *Perspectives*, vol. 3, Issue 7, Available at <http://www.brandchannel.com/images/papers/445_Direct_Navigation_final.pdf>, (2008),pp. 1-27.

Chitu, Alex "Google Results in Firefox's Address Bar", Retrieved from: <http://goog;esystem.blogspot.com/2008/07/google-results-in-firefoxs-address-bar.html> on Jan. 27, 2011, (Jul. 3, 2008),2 pages.

Zoch, Jamie "What is Direct Navigation? iPad.com Example", Retrieved from: <http://www.dotweekly.com/what-is-direct-navigation-ipad-example> on Jan. 27, 2011, (Apr. 1, 2010),5 pages.

"Foreign Office Action", CN Application No. 201210020147.8, Jan. 8, 2014, 10 Pages.

"Foreign Office Action", CN Application No. 201210020147.8, Oct. 30, 2014, 15 Pages.

"Foreign Office Action", CN Application No. 201210020147.8, Apr. 29, 2015, 10 Pages.

\* cited by examiner

DIRECT NAVIGATION THROUGH BROWSER ADDRESS BAR

BACKGROUND

Users who do not remember the web address of a particular site in which they are interested often must use a search engine to find the site. Specifically, the user typically types in a keyword, and then receives a search results page containing links that pertain to their search term. If a link on the search results page corresponds to the site in which they are interested, they can click on the corresponding site to be navigated to the site.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one or more embodiments, a Web browser receives user input in the form of text that is entered in a suitably-configured text entry bar, such as an address bar. The web browser processes the text and ascertains whether the text appears to be a search or an attempted navigation. Based on whether the text appears to be a search or an attempted navigation, the web browser communicates the text to a search provider, along with an indication of whether the text appears to be a search or an attempted navigation. The search provider receives the text and the indication and can then take appropriate action. For example, if the indication indicates that the text appears to be a search, the search provider can return a search results page. On the other hand, if the indication indicates that the text appears to be an attempted navigation, the search provider can cause the web browser to be redirected to a website associated with the received text.

In one or more embodiments, direct navigation through a Web browser's address bar can be facilitated by a specifically-configured URL that is sent, by the Web browser, to a particular search provider. The specifically-configured URL contains the text entered by the user, as well as an indication that the text is the subject of an attempted navigation. The search provider can then use the text to perform a mapping operation in which the text is mapped to a web address associated with a site that the search provider believes was the subject of the attempted navigation. Once the Web address is ascertained by the search provider, the search provider can cause the Web browser to be redirected to the site associated with the Web address.

In one or more embodiments, direct navigation functionality is pluggable in the sense that direct navigation can be employed across multiple search providers which may be installed in the Web browser. Further, in at least some embodiments, the Web browser enables a user to switch between different search providers for purposes that include using direct navigation through the Web browser's address bar.

BRIEF DESCRIPTION OF THE DRAWINGS

The same numbers are used throughout the drawings to reference like features.

DETAILED DESCRIPTION

Overview

In one or more embodiments, a Web browser receives user input in the form of text that is entered in a suitably-configured text entry bar, such as an address bar. The web browser processes the text and ascertains whether the text appears to be a search or an attempted navigation. Based on whether the text appears to be a search or an attempted navigation, the web browser communicates the text to a search provider, along with an indication of whether the text appears to be a search or an attempted navigation. The search provider receives the text and the indication and can then take appropriate action. For example, if the indication indicates that the text appears to be a search, the search provider can return a search results page. On the other hand, if the indication indicates that the text appears to be an attempted navigation, the search provider can cause the web browser to be redirected to a website associated with the received text.

In one or more embodiments, direct navigation through a Web browser's address bar can be facilitated by a specifically-configured, search provider-defined URL that is sent, by the Web browser, to a particular search provider that defined the URL. The specifically-configured URL contains the text entered by the user, as well as an indication that the text is the subject of an attempted navigation. The search provider can then use the text to perform a mapping operation in which the text is mapped to a web address associated with a site that the search provider believes was the subject of the attempted navigation. Once the Web address is ascertained by the search provider, the search provider can cause the Web browser to be redirected to the site associated with the Web address.

In one or more embodiments, direct navigation functionality is pluggable in the sense that direct navigation can be employed across multiple search providers which may be installed in the Web browser. Further, in at least some embodiments, the Web browser enables a user to switch between different search providers for purposes that include using direct navigation through the Web browser's address bar. This also allows a user to turn off this functionality so that they can simply search with a given search provider.

In the discussion that follows, a section entitled "Operating Environment" is provided and describes one environment in which one or more embodiments can be employed. Following this, a section entitled "Example Embodiment" describes an example embodiment. Next, a section entitled "Example Method" describes an example method in accordance with one or more embodiments. Last, a section entitled "Example System" describes a system that can be utilized to implement one or more embodiments.

Consider now an example operating environment in which one or more embodiments can be implemented.

Operating Environment

Figure 1:
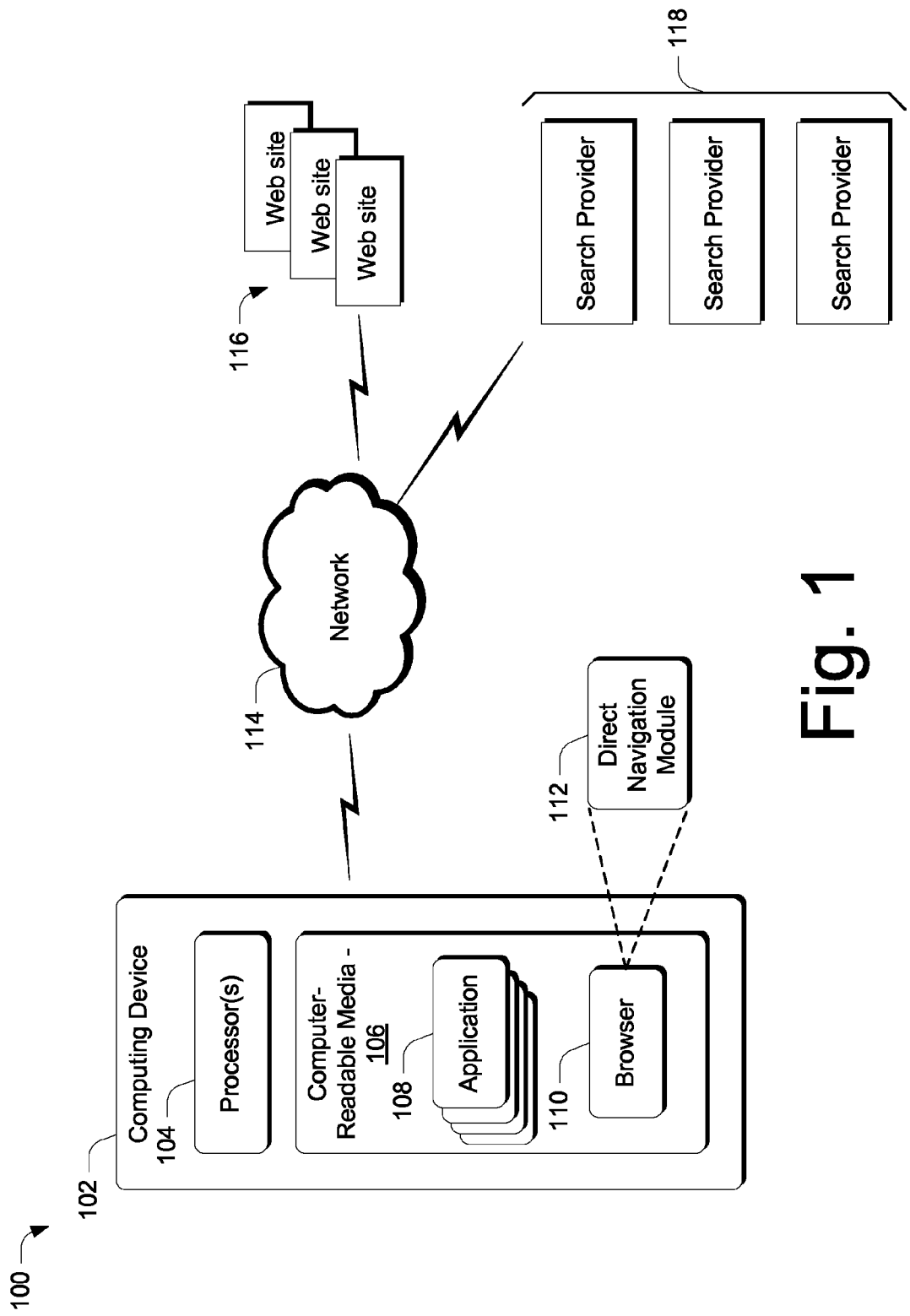
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 6.

In addition, computing device 102 includes a software application in the form of a web browser 110. Any suitable web browser can be used examples of which are available from the assignee of this document and others. In addition, computer-readable storage media 106 can include a direct navigation module 112 that operates as described above and below. In one or more embodiments, the direct navigation module is implemented in connection with a suitably-configured text entry bar, such as an address bar, associated with the web browser.

In addition, environment 100 includes a network 114, such as the Internet, one or more web sites 116 from and to which content can be received and sent, and one or more search providers 118 that are configured to perform searches and return search results to browser 110. Website content can include webpage content, such as HTML, script and the like.

In operation, Web browser 110 receives user input in the form of text that is entered in a suitably-configured text entry bar, such as an address bar. The web browser 110 processes the text and ascertains whether the text appears to be a search or an attempted navigation. Based on whether the text appears to be a search or an attempted navigation, the web browser 110 communicates the text to a search provider, such as one of providers 118, along with an indication of whether the text appears to be a search or an attempted navigation.

The search provider receives the text and the indication and can then take appropriate action. For example, if the indication indicates that the text appears to be a search, the search provider 118 can return a search results page that can be rendered by the browser. If, on the other hand, the indication indicates that the text appears to be an attempted navigation, the search provider can cause the web browser 110 to be redirected to a website associated with the received text. Examples of how this can be done are provided below.

Computing device 102 can be embodied as any suitable computing device such as, by way of example and not limitation, a desktop computer, a portable computer, netbook, a handheld computer such as a personal digital assistant (PDA), cell phone, and the like.

Having described an example operating environment, consider now a discussion of an example embodiment.

Example Embodiment

Figure 2:
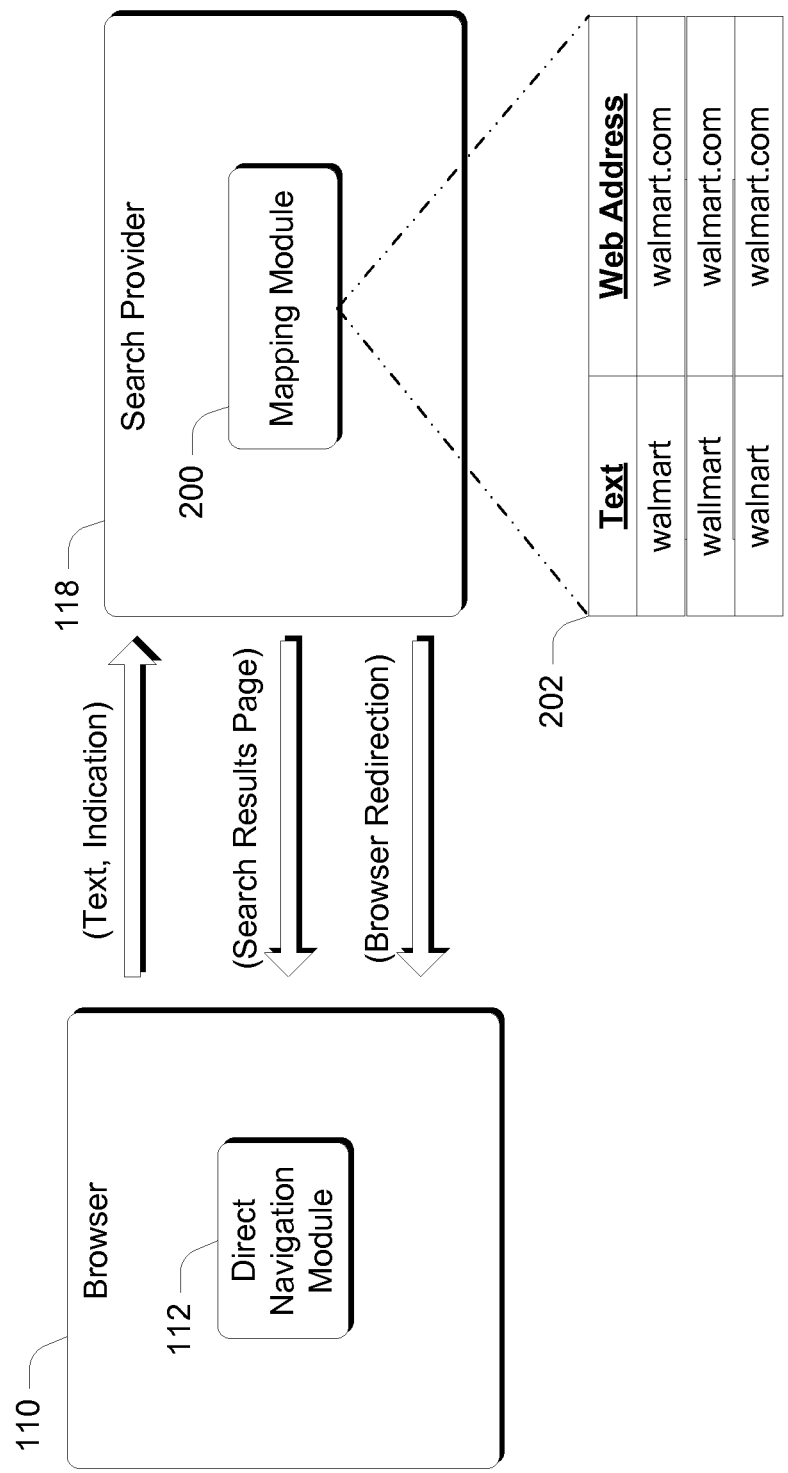
FIG. 2 illustrates aspects of a Web browser and a search provider in accordance with one or more embodiments.

FIG. 2 illustrates aspects of a Web browser 110 and a search provider 118 in accordance with one or more embodiments. As in the above example, Web browser 110 includes a direct navigation module 112. In addition, search provider 118 includes a mapping module 200 that includes a mapping data structure 202 that includes various mappings between text that can be received by search provider 118 and associated Web addresses.

In operation, Web browser 110 receives user input in the form of text that is entered in a suitably-configured text entry bar, such as an address bar. The web browser 110 processes the text using the direct navigation module 112 and ascertains whether the text appears to be a search or an attempted navigation.

In one or more embodiments, the Web browser 110 can ascertain whether text entered by user appears to be a search or an attempted navigation based on the format of the entered text. For example, the text that is entered may explicitly designate that it is a search such as, by way of example and not limitation, including a special character such as a "?" at the beginning of the text string. Alternately or additionally, the text may be ascertained to be associated with the search by virtue of a hot key combination that is entered along with the text. Further, a search can be initiated if a user selects a search suggestion that is received from a search provider. Other techniques can be used to indicate a search without departing from the spirit and scope of the claimed subject matter.

Based on whether the text appears to be a search or an attempted navigation, the web browser 110 communicates the text to search provider 118 along with an indication of whether the text appears to be a search or an attempted navigation. Any suitable type of indication can be utilized, as example of which is provided below.

Search provider 118 receives the text and the indication and can then take appropriate action.

For example, if the indication indicates that the text appears to be a search, the search provider 118 can return a search results page that can be rendered by the browser. If, on the other hand, the indication indicates that the text appears to be an attempted navigation, the search provider's mapping module 200 utilizes the data structure 202 to map the received text to a particular web address. The search provider can then cause the web browser 110 to be redirected to a website associated with the received text and corresponding web address.

In the illustrated example, notice that several different spellings of "Wal-Mart" appear in the "text" column. Each of these different spellings is mapped to the same corresponding web address. Any suitable type of entry can appear in the "text" column such as those that use wild cards or regular expressions. This is useful in situations where, for example, a user may be unfamiliar with the web address associated with Wal-Mart, but yet understands that the web address may somehow be related to the spelling of the store's name. The user may then enter, in the Web browser's address bar, a spelling or misspelling of "Wal-Mart." Based on the entered text, the Web browser or, more accurately, direct navigation module 112, provides the entered text and an indication that the text appears to be associated with a navigation, to the search provider 118. Accordingly, mapping module 200 uses the received text to map a spelling or misspelling of "Wal-Mart" to the appropriate Web address. The search provider 118 can then provide or otherwise cause a browser redirection of browser 110 to the corresponding web address automatically, thus providing for a direct navigation through the Web browser's address bar.

In one or more embodiments, direct navigation through a Web browser's address bar can be facilitated by a specifically-configured URL that is sent, by the Web browser, to a particular search provider. The specifically-configured URL contains the text entered by the user, as well as an indication that the text is the subject of an attempted navigation. Any suitable type of specifically-configured URL can be utilized. As an example, consider the following element that defines one type of specifically-configured URL:

```
<ie:TopResult type="text/html"
template="http://topresult.example.com/search.aspx?q={searchTerms}"/>
```

In this particular example, an element "TopResult" can be defined in an OpenSearch description file which is received by Web browser 110 from search provider 118. The OpenSearch description file describes or otherwise defines how the browser should interface with the search provider 118. In this particular example, the "TopResult" element that is received as part of the OpenSearch description file defines a URL that is to be used by the Web browser and returned to the search provider to provide not only an indication that the text entered by the user appears to be an attempted navigation, but also the actual text entered by the user, e.g., "{searchTerms}".

Based on the information received in the specifically-configured URL, the search provider can then use the text to perform its mapping operation in which the text is mapped to a web address associated with a site that the search provider believes was the subject of the attempted navigation. Once the Web address is ascertained by the search provider, the search provider can cause the Web browser to be redirected to the site associated with the Web address as described above. In the event that the text entered by user is associated with a search, and the Web browser can use a typical search URL to send the text to search provider 118.

In one or more embodiments, direct navigation functionality is pluggable in the sense that direct navigation can be employed across multiple search providers which may be installed in the Web browser. Pluggability across multiple search providers can occur by individual search providers providing, as part of its OpenSearch description file, a "TopResult" element as described above.

Further, in at least some embodiments, the Web browser enables a user to switch between different search providers for purposes that include using direct navigation through the Web browser's address bar. That is, if multiple different search providers are installed in the browser and support direct navigation functionality, when the user switches between search providers, direct navigation functionality will be exposed to the user in a seamless and transparent manner.

Figure 3:
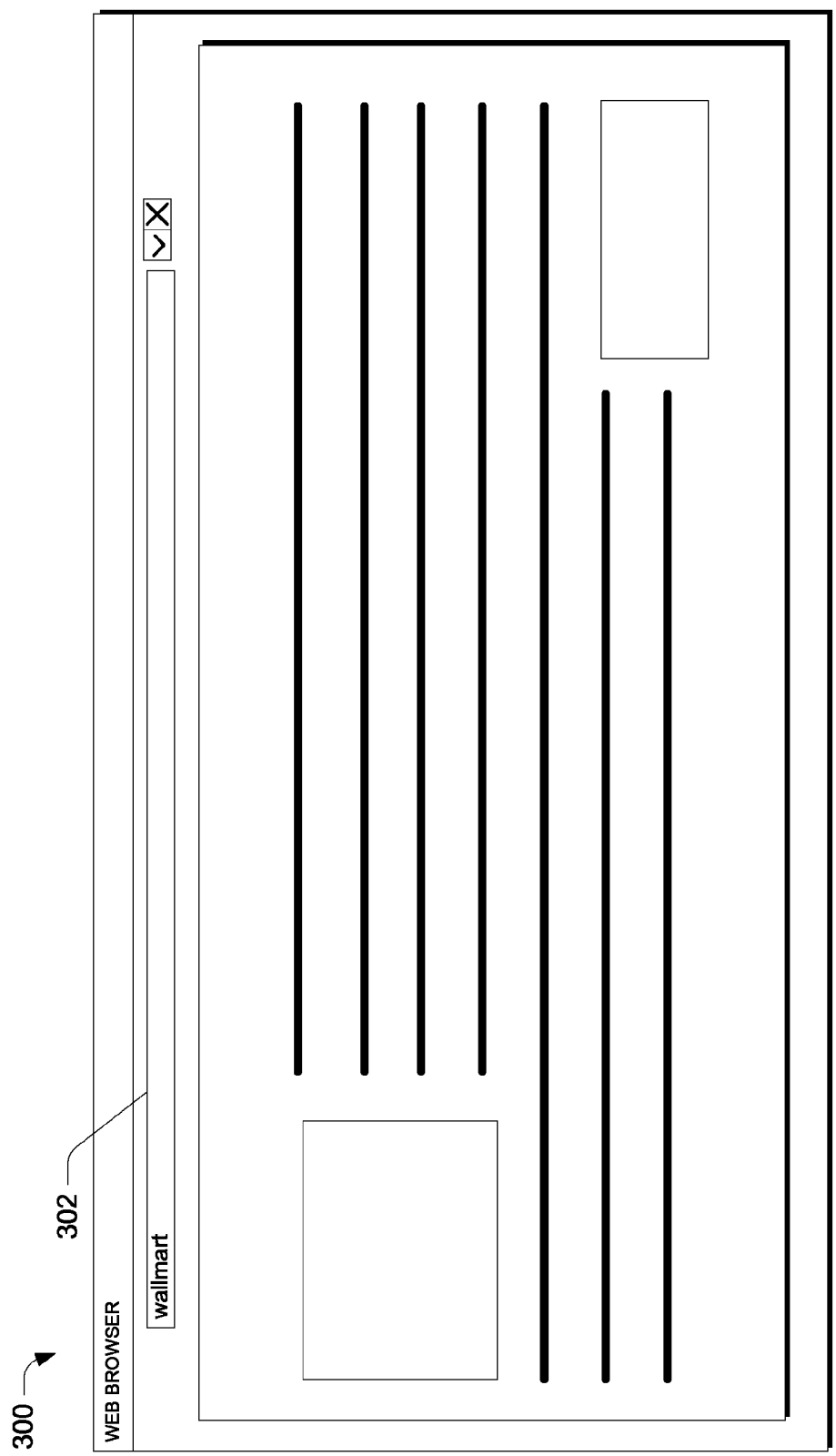
FIG. 3 illustrates an example user interface experience in accordance with one or more embodiments.
Figure 4:
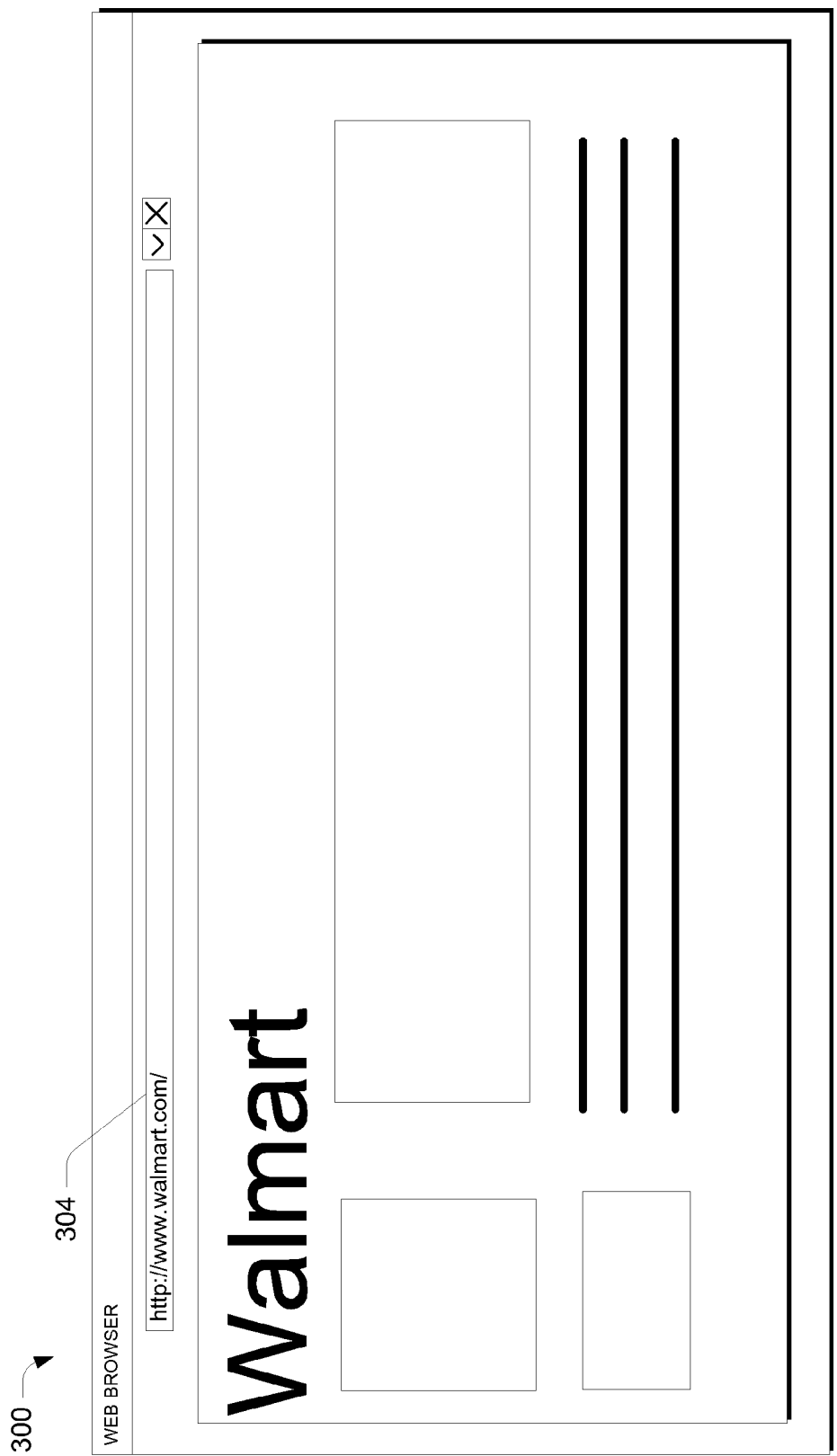
FIG. 4 illustrates an example user interface experience in accordance with one or more embodiments.

As an example user interface experience, consider FIG. 3 which illustrates an example Web browser generally at 300 that includes an address bar 302. Notice that a user has typed in "wallmart" into the address bar 302. As a result, and in connection with the processing described just above, the Web browser can inform a selected search provider of the text that the user has entered along with an indication that the text appears to be associated with an attempted navigation. The search provider can process the text as described above and can cause a redirection of the Web browser to a Web address associated with the Wal-Mart site. As an example, consider FIG. 4.

There, Web browser 300 has been automatically redirected to the Wal-Mart website and "http://www.walmart.com/" now appears in address bar 304. In this example, the Web browser can be automatically navigated to a site without the user having to select a link associated with the site, such as one appearing on a search results page, or performing any other user action.

Having described an example embodiment including a user interface experience in accordance with one or more embodiments, consider now an example method in accordance with one or more embodiments.

Example Method

Figure 5:
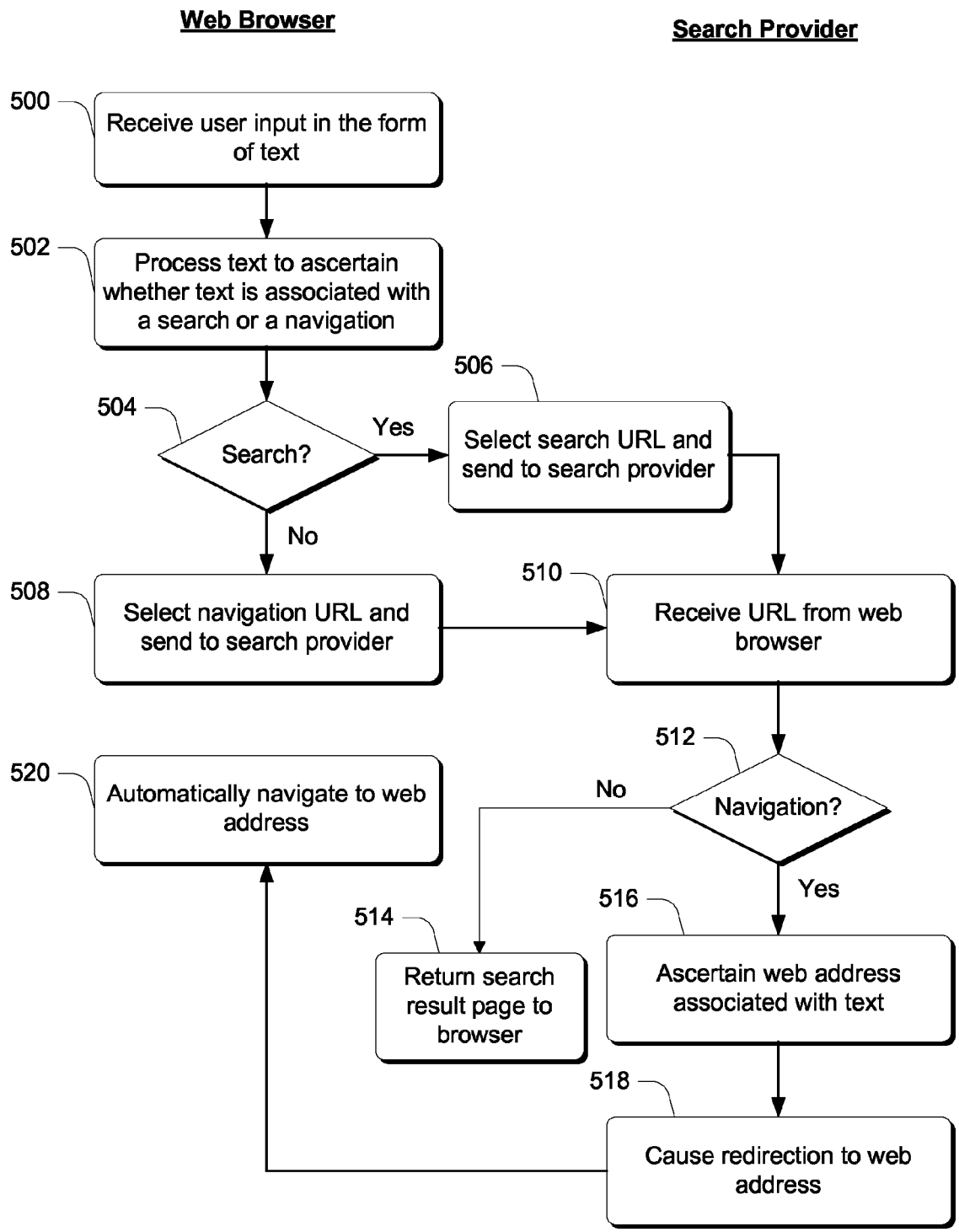
FIG. 5 is a flow diagram that describes steps in a method in accordance with one or more embodiments.

FIG. 5 is a flow diagram that describes steps in a method in accordance with one or more embodiments. The method can be performed by any suitably-configured software, hardware, firmware, or combination thereof. In at least some embodiments, some aspects of the method can be performed by a suitably-configured Web browser such as that described above, and other aspects of the method can be performed by a suitably-configured search provider.

Step 500 receives, using a suitably-configured Web browser, user input in the form of text that is entered by user. Examples of how this can be done are provided above. Step 502 processes the text to ascertain whether the text is associated with a search or an attempted navigation. Examples of how this can be done are provided above. If, at step 504, the text is ascertained to be associated with a search, step 506 selects a suitable search URL and sends the search URL along with the text to a search provider. If, on the other hand, step 504 ascertains that the text is not associated with a search but rather is associated with an attempted navigation, step 508 selects a navigation URL and sends the navigation URL along with the text to the search provider.

Step 510 receives, at the search provider, the URL provided from the Web browser. Step 512 ascertains whether the URL is associated with a navigation. If not, step 514 returns a search result page to the Web browser that contains search results associated with the text that was received. If, on the other hand, step 512 ascertains that the URL is associated with a navigation, step 516 ascertains a Web address associated with the text and step 518 causes a redirection of the Web browser to the Web address.

As a result, step 520 automatically navigates the Web browser to the Web address as a result of the redirection caused by the search provider.

Having described an example method in accordance with one or more embodiments, consider now an example system that can be utilized to implement one or more of the above-described embodiments.

Example System

Figure 6:
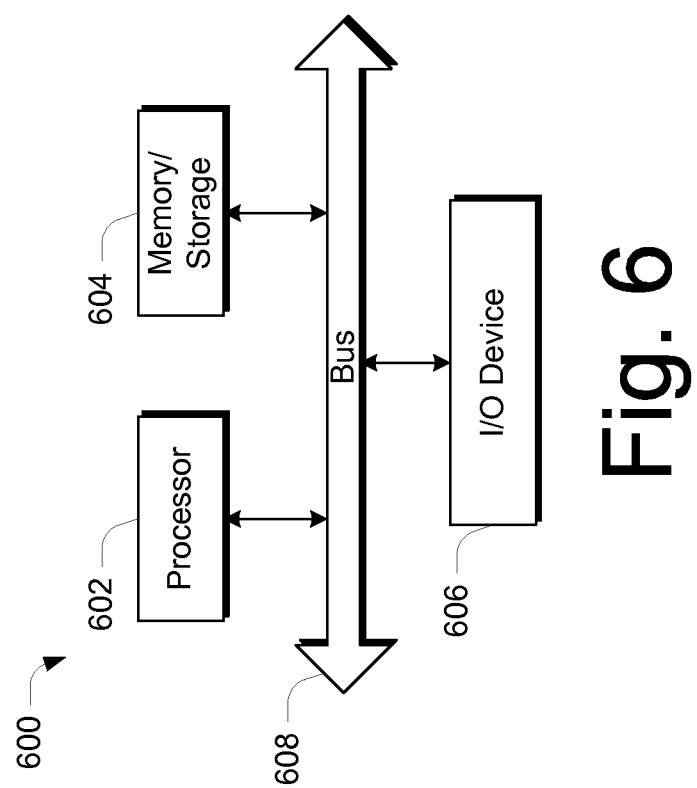
FIG. 6 illustrates an example system that can be utilized to implement one or more embodiments.

FIG. 6 illustrates an example computing device 600 that can be used to implement the various embodiments described above. Computing device 600 can be, for example, computing device 102 of FIG. 1 or any other suitable computing device.

Computing device 600 includes one or more processors or processing units 602, one or more memory and/or storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Component 604 can include volatile media (such as random access memory (RAM)) and/or nonvolatile media (such as read only memory (ROM), Flash memory, optical disks, magnetic disks, and so forth). Component 604 can include fixed media (e.g., RAM, ROM, a fixed hard drive, etc.) as well as removable media (e.g., a Flash memory drive, a removable hard drive, an optical disk, and so forth).

One or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

In one or more embodiments, a Web browser receives user input in the form of text that is entered in a suitably-configured text entry bar, such as an address bar. The web browser processes the text and ascertains whether the text appears to be a search or an attempted navigation. Based on whether the text appears to be a search or an attempted navigation, the web browser communicates the text to a search provider, along with an indication of whether the text appears to be a search or an attempted navigation. The search provider receives the text and the indication and can then take appropriate action. For example, if the indication indicates that the text appears to be a search, the search provider can return a search results page. On the other hand, if the indication indicates that the text appears to be an attempted navigation, the search provider can cause the web browser to be redirected to a website associated with the received text.

In one or more embodiments, direct navigation through a Web browser's address bar can be facilitated by a specifically-configured, search provider-specified URL that is sent, by the Web browser, to a particular search provider. The specifically-configured URL contains the text entered by the user, as well as an indication that the text is the subject of an attempted navigation. The search provider can then use the text to perform a mapping operation in which the text is mapped to a web address associated with a site that the search provider believes was the subject of the attempted navigation. Once the Web address is ascertained by the search provider, the search provider can cause the Web browser to be redirected to the site associated with the Web address.

In one or more embodiments, direct navigation functionality is pluggable in the sense that direct navigation can be employed across multiple search providers which may be installed in the Web browser. Further, in at least some embodiments, the Web browser enables a user to switch between different search providers for purposes that include using direct navigation through the Web browser's address bar.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving, with a web browser, user input in the form of text;
   presenting at least one search suggestion relating to the user input capable of replacing the text of the user input;
   responsive to selection of the search suggestion, associating the text with a search and communicating the text to a search provider;
   responsive to no selection of the search suggestion, processing the text to ascertain whether the text is associated with a search or a navigation;
   responsive to the text being associated with a search or a navigation, communicating the text to a search provider along with an indication of whether the text appears, respectively, to be associated with a search or a navigation, wherein the web browser is configured to be able to submit text as a misspelling to the search provider, and be redirected to a single web address associated with the misspelling; and
   responsive to the text being associated with a navigation, selecting a navigation URL that is configured to provide the text and the indication to the search provider, the indication indicating that the text is a subject of an attempted navigation.

2. The computer-implemented method of claim 1, further comprising performing said communicating using the navigation URL.

3. The computer-implemented method of claim 1, further comprising performing said communicating using the navigation URL, and wherein the navigation URL is different from a search URL.

4. The computer-implemented method of claim 1, further comprising performing said communicating using the navigation URL, and after said communicating, automatically redirecting the web browser to a web address associated with the text, said redirecting being caused by the search provider.

5. The computer-implemented method of claim 1, wherein said receiving is performed by receiving the user input in an address bar of the Web browser.

6. The computer-implemented method of claim 1, wherein the web browser is configured to perform said communicating with multiple different search providers.

7. The computer-implemented method of claim 1, wherein the web browser is configured to enable a user to switch between different search providers for purposes that include performing said communicating.

8. The computer-implemented method of claim 1, wherein said processing is performed by ascertaining whether the text is associated with a search or navigation based on the text's format.

9. One or more computer-readable storage memories storing computer readable instructions which, when executed, implement a method comprising:
   receiving, with a web browser and through an address bar associated with the web browser, user input in the form of text;
   processing the text to ascertain whether the text is associated with a search or a navigation;
   responsive to the text being associated with a navigation, selecting a navigation URL that is configured to provide both the text and an indication to a search provider that the text is associated with an attempted navigation to a site associated with a web address, wherein the web browser is configured to be able to submit text as a misspelling to the search provider, and be redirected to a single web address associated with the misspelling;

using the navigation URL to communicate the text to the search provider along with the indication; and responsive to the text being associated with a search, selecting a different URL to provide both said text associated with a search to the search provider and an indication that the text appears to be a search.

10. The one or more computer-readable storage memories of claim 9 further comprising after said using, automatically redirecting the web browser to the web address associated with the text, said redirecting being caused by the search provider.

11. The one or more computer-readable storage memories of claim 9, wherein the navigation URL is different from a search URL.

12. The one or more computer-readable storage memories of claim 9, wherein the web browser is configured to perform said using with multiple different search providers.

13. The one or more computer-readable storage memories of claim 9, wherein said selecting is performed by selecting a navigation URL that is specified in an OpenSearch description file.

14. The one or more computer-readable storage memories of claim 9, wherein the web browser is configured to enable a user to switch between different search providers for purposes that include performing said using.

15. The one or more computer-readable storage memories of claim 9, wherein said processing is performed by ascertaining whether the text is associated with a search or navigation based on the text's format.

16. A system comprising:
one or more processors;
one or more computer-readable storage memories embodying computer readable instructions which, when executed by the one or more processors, implement:
a Web browser configured to receive user input via an address bar and, based upon a format of the user input, select from among two different URLs, a first of the URLs being configured to enable a search provider to cause a redirection of the web browser to a web address associated with the user input based at least in part on an indication that the text is the subject of an attempted navigation to the web address, the web address being associated with at least one spelling of at least one word of the user input, a second of the URLs being configured to enable the search provider to return, to the web browser, a search results page associated with the user input based at least in part on an indication that the text is the subject of an attempted search, the Web Browser being configured to be able to submit text as a misspelling to the search provider, and be redirected to a single web address associated with the misspelling.

17. The system of claim 16, wherein the web browser is configured to select from among the two different URLs for multiple different search providers.

18. The system of claim 16, wherein at least one of the two different URLs is specified in an OpenSearch description file provided by the search provider.

19. The system of claim 16, wherein the web browser is configured to enable the search provider to cause redirection of the web browser without further user action.

* * * * *